(12) United States Patent
Zhao et al.

(10) Patent No.: US 9,590,501 B2
(45) Date of Patent: Mar. 7, 2017

(54) FAST LOAD TRANSIENT RESPONSE POWER SUPPLY SYSTEM USING DYNAMIC REFERENCE GENERATION

(71) Applicant: Fairchild Semiconductor Corporation, San Jose, CA (US)

(72) Inventors: Bin Zhao, Irvine, CA (US); Siqiang Fan, Foothill Ranch, CA (US)

(73) Assignee: Fairchild Semiconductor Corporation, Sunnyvale, CA (US)

( * ) Notice: Subject to any disclaimer, the term of this patent is extended or adjusted under 35 U.S.C. 154(b) by 801 days.

(21) Appl. No.: 13/870,583

(22) Filed: Apr. 25, 2013

(65) Prior Publication Data
US 2014/0320093 A1 Oct. 30, 2014

(51) Int. Cl.
*G05F 1/10* (2006.01)
*H02M 3/156* (2006.01)
*H02M 1/00* (2006.01)

(52) U.S. Cl.
CPC .... *H02M 3/156* (2013.01); *H02M 2001/0025* (2013.01)

(58) Field of Classification Search
CPC .............. H02M 2001/0025; H02M 3/156
USPC .......... 323/222, 234, 271, 282–290
See application file for complete search history.

(56) References Cited

U.S. PATENT DOCUMENTS

| 8,138,739 B1 * | 3/2012 | Eirea .................. H02M 3/1588 323/271 |
| 9,083,238 B2 * | 7/2015 | Yashiki .............. H02M 3/1563 |
| 2008/0218139 A1 | 9/2008 | Takagi |
| 2012/0249093 A1 | 10/2012 | Grbo et al. |
| 2013/0038310 A1 | 2/2013 | Menegoli et al. |

FOREIGN PATENT DOCUMENTS

| CN | 101261525 | 9/2008 |
| CN | 201750340 | 2/2011 |

* cited by examiner

*Primary Examiner* — Adolf Berhane
*Assistant Examiner* — Afework Demisse
(74) *Attorney, Agent, or Firm* — Grossman Tucker Perreault & Pfleger PLLC

(57) ABSTRACT

The present disclosure is directed to a fast load transient response power supply system using dynamic reference voltage generation. A system may comprise, for example, at least power supply circuitry, voltage reference circuitry and dynamic reference generation circuitry. The power supply circuitry may be configured to generate an output voltage (e.g., for driving a load) based on a power supply input voltage. The voltage reference circuitry may be configured to generate a reference voltage for use in controlling the generation of the output voltage. The dynamic reference generation circuitry may be configured to generate a dynamic reference voltage as the input voltage for the power supply circuitry based on the reference voltage and the output voltage.

20 Claims, 7 Drawing Sheets

System 100'

FAST LOAD TRANSIENT RESPONSE POWER SUPPLY SYSTEM USING DYNAMIC REFERENCE GENERATION

TECHNICAL FIELD

The present disclosure relates to power supply system control, and more particularly, to systems including additional control loops for facilitating more accurate output voltage control.

BACKGROUND

Accurately controlling the voltage output from a power supply does not simply entail the provision of an input voltage that will, based on the configuration of the power supply, generate the desired output voltage. For example, power supply circuitry should be controlled to generate a desired output voltage with minimal undershoot or overshoot caused by fast transient load changes. Output voltage undershoot or overshoot may be caused by, for example, a delay in response caused by characteristics of componentry in the circuitry of the power supply. For example, resistors, inductors, capacitors and other components having resistive, inductive or capacitive qualities take some finite time to reach the settling steady state because of their voltage/current storage characteristics. If this behavior is not accounted for, components may undercharge/overcharge as the power supply approaches steady state, causing the power supply output voltage to deviate significantly from the targeted value. Inaccuracy or deviation from the targeted value in the power supply output voltage can cause a malfunction or possibly even damage in a load being driven by the power supply, especially when the load includes sensitive circuitry (e.g., a microprocessor).

Higher accuracy in power supply output voltage may be realized through the use of one or more feedback loops. For example, the output voltage of a power supply may be fed back to control circuitry (e.g., via a feedback network) to more precisely control the power supply output voltage. Observer circuitry may also be employed as a secondary feedback loop to provide fast transient response (e.g., for loads that may include sensitive circuitry like a microprocessor). To realize fast transient response the observer circuitry may be very sensitive to changes in power supply output voltage, which makes the observer circuitry inappropriate for some power control schemes. For example, observer circuitry may not be appropriate for use with dynamic voltage scaling (DVS) that purposely changes the power supply output voltage in accordance with the DVS control scheme required by the load. The observer circuitry will try to prevent the desired voltage change, and as a result, the rate at which the power supply output voltage changes will be greatly reduced. Similar to output voltage inaccuracy, slow responsiveness in the power supply output voltage change may negatively affect performance for the load being driven, especially for sensitive loads.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
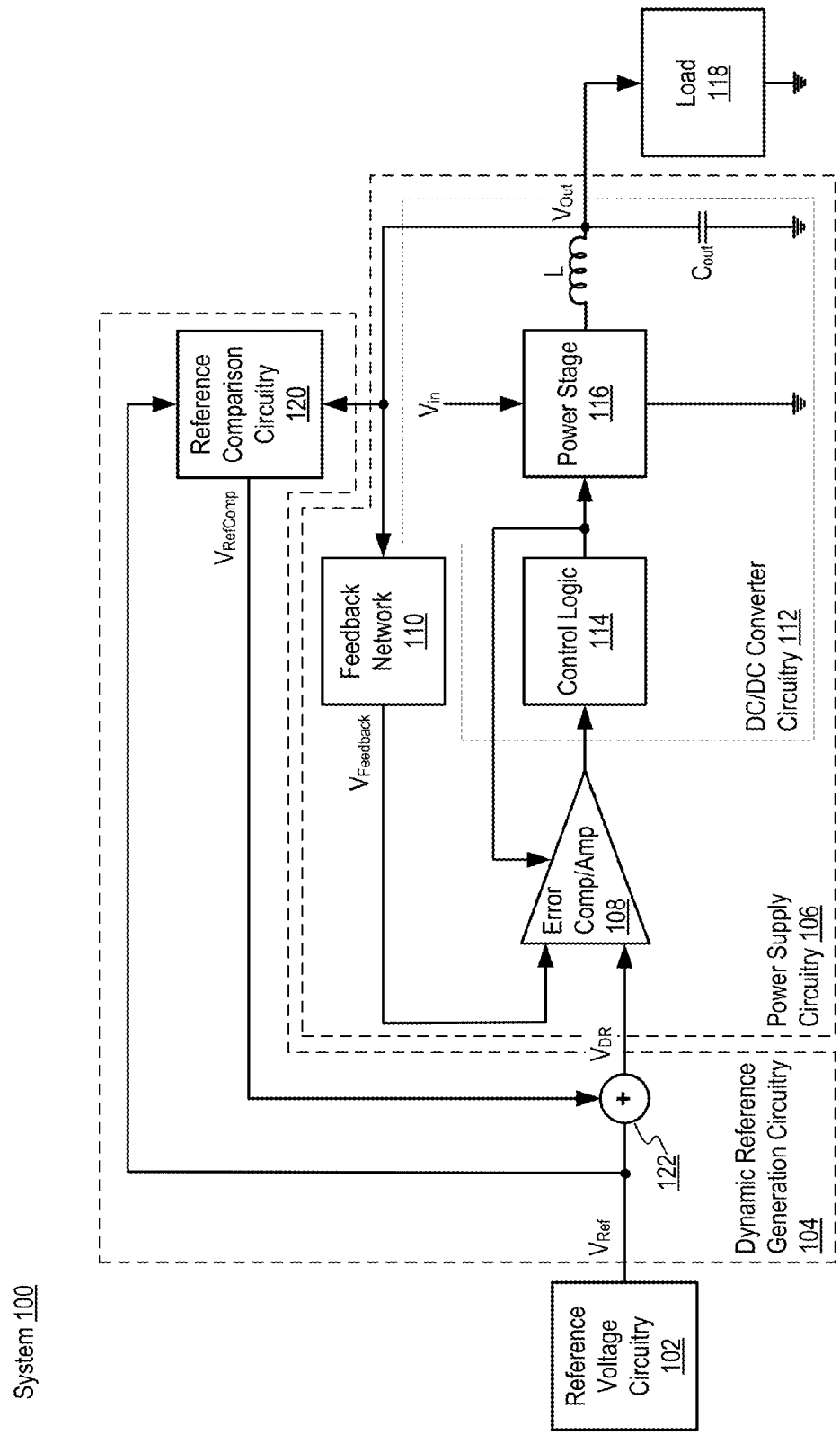
FIG. 1 illustrates an example fast load transient response power supply system using dynamic reference generation in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

In general, this disclosure describes a fast transient response power supply system. An example system may comprise at least power supply circuitry, voltage reference circuitry and dynamic reference generation circuitry. The power supply circuitry may be configured to generate an output voltage (e.g., for driving a load), the output voltage being based on a voltage input into the power supply circuitry. The voltage reference circuitry may be configured to provide a reference voltage for use in controlling the power supply circuitry output voltage. The dynamic reference generation circuitry may be configured to generate a dynamic reference voltage as input to the power supply circuitry based on the power supply output voltage (e.g., fed back from the output of the power supply circuitry) and the reference voltage.

In one embodiment, the dynamic reference generation circuitry may comprise at least reference comparison circuitry including at least an amplifier configured to generate a reference comparison voltage based on the output voltage and the reference voltage. For example, the reference comparison circuitry may be configured to generate a positive reference comparison voltage based on the difference between the output voltage and the reference voltage when the output voltage is less than the reference voltage. Conversely, the reference comparison circuitry may be configured to generate a negative reference comparison voltage based on the difference between the output voltage and the reference voltage when the output voltage is greater than the reference voltage. In another example configuration, the dynamic reference generation circuitry may include a resistor-capacitor (RC) network coupled to an input of the amplifier in the reference comparison circuitry, the RC network being configured to alternating current (AC) couple the output voltage to the amplifier input and direct current (DC) couple the reference voltage to the amplifier input. The dynamic reference generation circuitry may further comprise summing circuitry configured to generate the dynamic reference voltage to power supply circuitry input by adding the reference comparison voltage to the reference voltage.

In the same or a different embodiment, the power supply circuitry may comprise at least error comparator or error amplifier circuitry, control logic circuitry, feedback network circuitry and power stage circuitry. The error comparator or error amplifier circuitry may be configured to generate a logical input for the use by control logic circuitry based on the dynamic reference voltage and a feedback voltage provided by the feedback network circuitry. For example, the error amplifier circuitry may be configured to generate a high logical input when the dynamic reference voltage is greater than the feedback voltage and a low logical input when the dynamic reference voltage is less than the feedback voltage. In one embodiment, the power supply circuitry may comprise power stage circuitry coupled to an inductor configured to generate the output voltage, the power stage circuitry being configured to cause the power stage circuitry to engage a power source to charge the inductor when receiving the high logical input (e.g., for increasing the output voltage), while receiving the low logical input may cause the power stage circuitry to disengage the power source from charging the inductor (e.g., for decreasing the output voltage). Moreover, the feedback voltage circuitry may be configured to generate the feedback voltage based on the voltage supplied to the inductor and the output voltage. An example method consistent with at least one embodiment of the present disclosure may comprise receiving a reference voltage and a voltage output from power supply circuitry, generating a reference comparison voltage based on the reference voltage and the output voltage, generating a dynamic reference voltage based on the reference comparison voltage and the reference voltage, providing the dynamic reference voltage as input to the power supply circuitry and generating the output voltage in the power supply circuitry based on the dynamic reference voltage.

FIG. 1 illustrates example system 100 usable in accordance with at least one embodiment of the present disclosure. System 100 may comprise reference voltage circuitry 102, dynamic reference generation circuitry 104, power supply circuitry 106 and load 118. Reference voltage circuitry 102 may include hardware and/or software configured to output a reference voltage for use in controlling the output voltage of power supply circuitry 106. While not illustrated in FIG. 1, an example implementation of reference voltage circuitry 102 may include a controller (e.g., microcontroller) and a digital-to-analog converter (DAC) either incorporated within, or coupled to, the controller. The controller may be configured to provide various digital codes to the DAC, each digital code representing an analog voltage level corresponding to a set point (SP) for power supply circuitry 106. For example, the SP may be increased incrementally by the controller as part of a control scheme like DVS. The DAC may be configured to generate analog voltages based on the digital codes.

Dynamic reference generation circuitry 104 may comprise, for example, reference comparison circuitry 120 and summing node 122. Reference comparison circuitry 120 may be configured to receive a reference voltage from reference voltage circuitry 102 and an output voltage ($V_{Out}$) from power supply circuitry 106, and to generate a reference comparison voltage ($V_{RefComp}$) for summing circuitry 122. Existing observer feedback techniques employ a constant input voltage, which results in the observer being resistant to changes in the output voltage. In existing systems provisions must then be made to disengage observer feedback at certain times (e.g., when the reference voltage is being changed). Besides adding complexity, reengaging observer feedback at the wrong time can result in system malfunction. For example, reengaging observer feedback too quickly may cause the responsiveness of the power supply output voltage to seriously lag (e.g., be delayed), and reengaging observer feedback after the output voltage reaches the desired level may lead to large load transients (e.g., it may cause the output voltage to droop undesirably low upon a sudden increase in load current). These conditions can impair performance, or even cause a malfunction, in sensitive loads (e.g., microprocessors). At least one benefit that may be realized in using the reference voltage as an input is that dynamic reference generation circuitry 104 becomes less resistant to change in the output voltage when reference voltage ($V_{Ref}$) is purposely changed, making system 100 much more responsive for use with control schemes like DVS. As a result, dynamic reference generation circuitry 104 may always be active. Summing circuitry 122 may include componentry configured to add the reference comparison voltage to the reference voltage, and to provide the sum of these voltages, the dynamic reference voltage ($V_{DR}$) as input to power supply circuitry 106.

Power supply circuitry 106 may comprise, for example, error comparator or error amplifier circuitry (e.g., Error Comp/Amp 108), feedback network circuitry 110 and DC/DC converter circuitry 112. In one embodiment, error comparator or error amplifier circuitry 108 may be configured to receive the dynamic reference voltage from dynamic reference generation circuitry 104 and a feedback voltage ($V_{Feedback}$) via feedback network 110, and to provide a logical input to DC/DC converter circuitry 112. DC/DC converter circuitry 112 may be based on an existing converter topologies such as, for example, buck, boost, buck-boost, single-ended primary-inductor converter (SEPIC), flyback, power factor correction (PFC) flyback, half-bridge, full-bridge, Ćuk, etc. The above example DC/DC converter topologies may include functional elements such as control logic circuitry 114, power stage circuitry 116, inductor L and output capacitor $C_{out}$. For example, control logic circuitry 114 may be configured to cause power stage circuitry 116 to engage or disengage a power source (e.g., $V_{in}$) based on the logical input received from error comparator or error amplifier circuitry 108, the power source being configured to supply a voltage to inductor L. Current from inductor L may charge output capacitor $C_{out}$ to generate the power supply output voltage. In addition to driving load 118, the power supply output voltage (e.g., the voltage across $C_{out}$) may also be provided to dynamic reference generation circuitry 104 and to feedback network circuitry 110 for control purposes.

Figure 2:
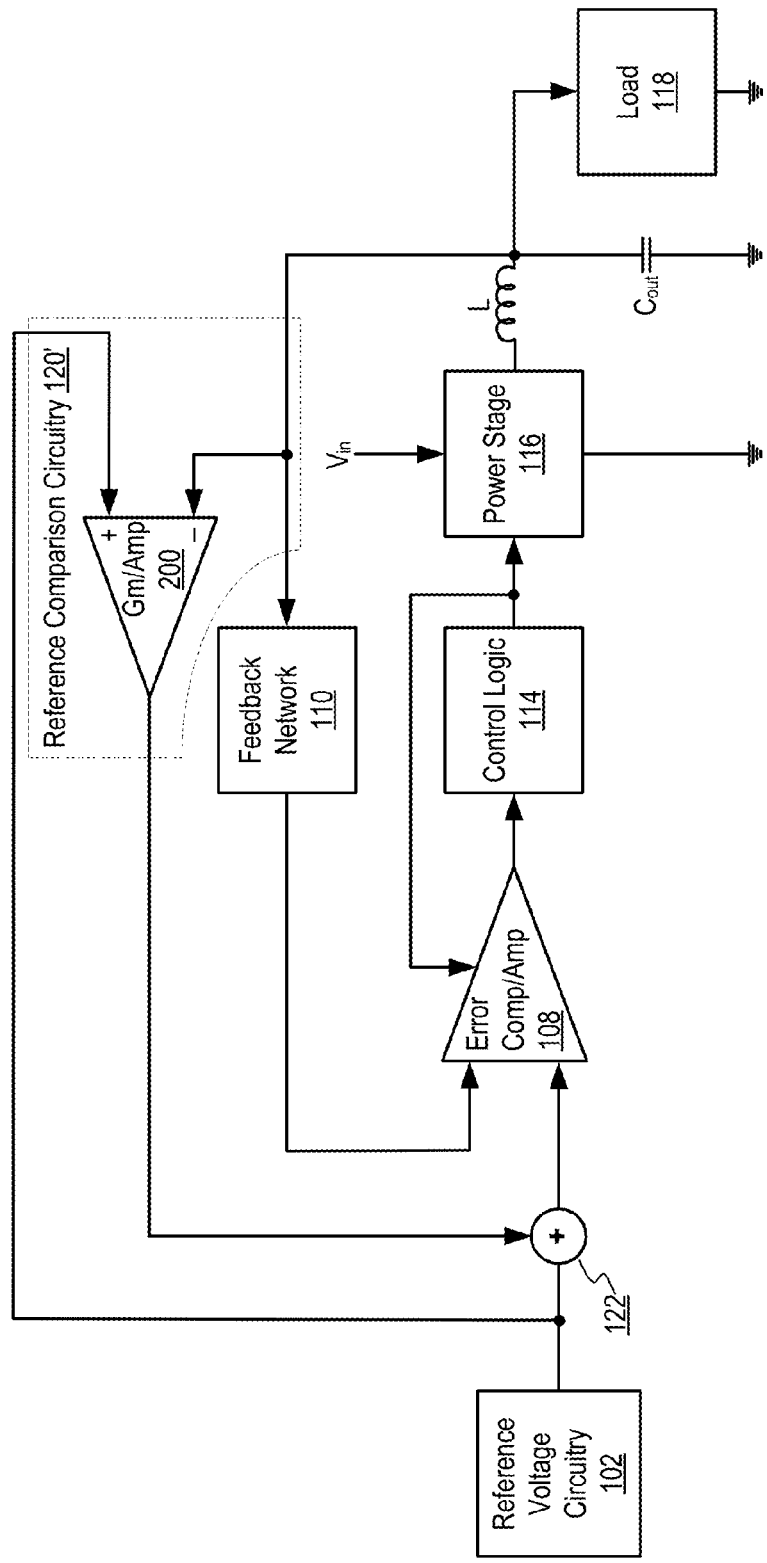
FIG. 2 illustrates example configuration for reference comparison circuitry in accordance with at least one embodiment of the present disclosure.

FIG. 2 illustrates example configuration for reference comparison circuitry 120' in system 100' in accordance with at least one embodiment of the present disclosure. Reference comparison circuitry 120' may include, for example, a transconductance stage or an amplifier 200 (Gm/Amp 200) configured to output a reference comparison current or voltage based on the reference voltage and the output voltage. For example, Gm/Amp 200 may be configured to output a positive voltage based on the difference between the reference voltage and the output voltage when the reference voltage is greater than the output voltage, and may output a negative voltage based on the difference between the reference voltage and the output voltage when the reference voltage is less than the output voltage. As a result, when the output voltage is less than the reference voltage the reference comparison voltage may be added to the reference voltage by summation circuitry 122, and when the output voltage is greater than the reference voltage, the reference comparison voltage may be subtracted from the reference voltage (e.g., since the reference comparison voltage is negative) by summation circuitry 122.

The dynamic reference voltage output from summation circuitry 122 (e.g., the input voltage to power supply circuitry 106) may be provided to error comparator or error amplifier circuitry 108, which may compare the input voltage to a feedback voltage received from feedback network 110. While not illustrated in FIG. 2, feedback network circuitry 110 may include, for example, resistor/capacitor elements and networks. For example, error comparator or error amplifier circuitry 108 may be configured to output a high logical value (e.g., a voltage associated with a logical "1") when the input voltage is greater than the feedback voltage, and a low logical value (e.g., a voltage associated with a logical "0") when the input voltage is less than the feedback voltage. In one embodiment, error comparator or error amplifier circuitry 108 may also be aware of the current state of control logic circuitry 114 through a loop feeding back the output of control logic circuitry 114 for improved operation, such as by introducing some hysteresis in error comparator or error amplifier circuitry 108. Control logic circuitry 114 may include a controller configured to cause power stage circuitry 116 to engage $V_{in}$ to supply a voltage to inductor L when a high logical input is received, and to disengage $V_{in}$ from supplying a voltage to inductor L when a low logical input is received. The current generated by inductor L may charge capacitor $C_{out}$, which may be configured to provide the output voltage to load 118, to feedback network circuitry 110 and to reference comparison circuitry 120'.

Figure 3:
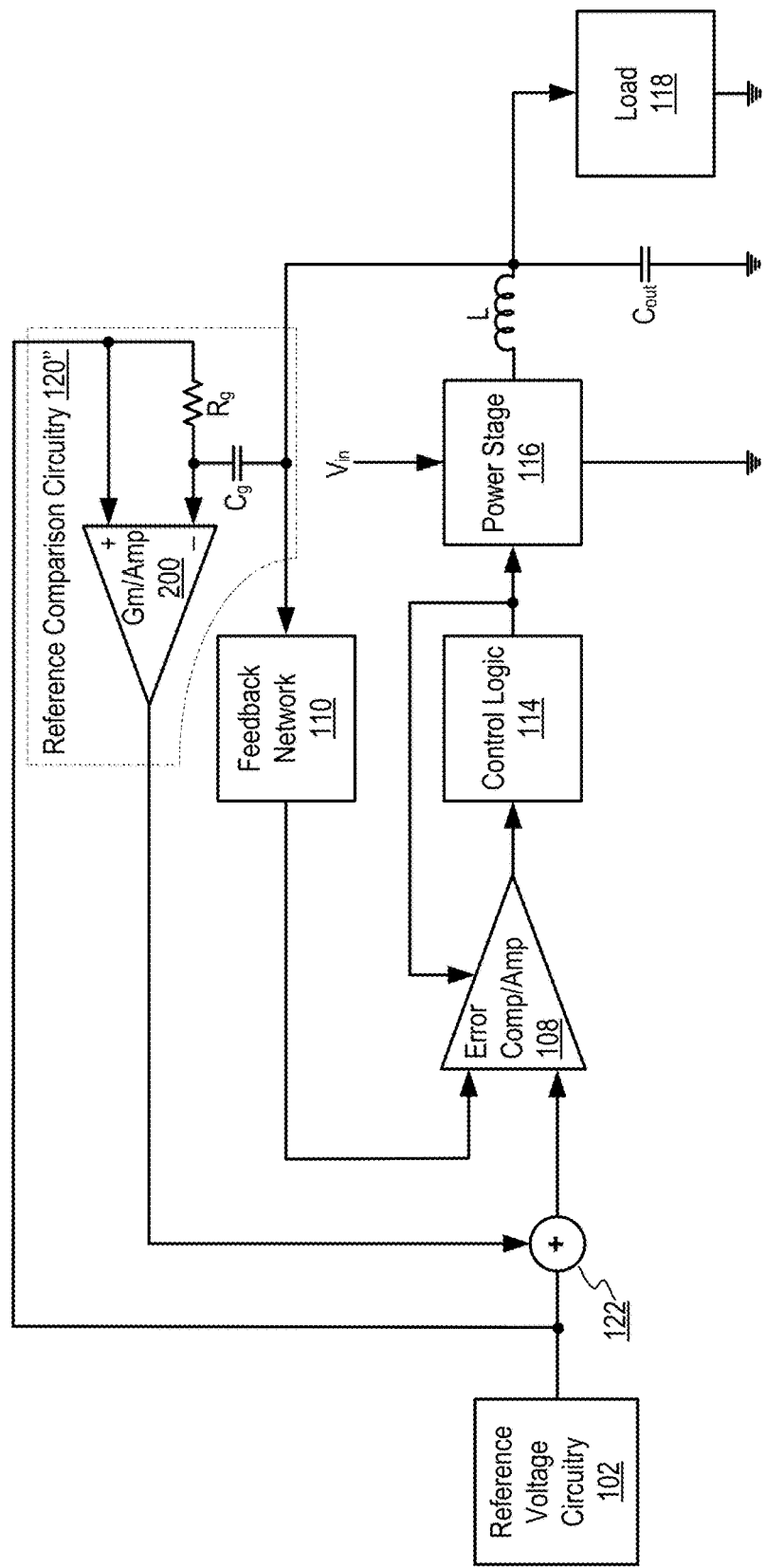
FIG. 3 illustrates an alternative configuration for reference comparison circuitry in accordance with at least one embodiment of the present disclosure.

FIG. 3 illustrates an alternative configuration for dynamic reference generation circuitry 120 (e.g., dynamic reference generation circuitry 120" in system 100") in accordance with at least one embodiment of the present disclosure. In FIG. 3 the second input to Gm/Amp 200 is not simply the voltage fed back from the output of power supply circuitry 106, but instead is generated by an RC network including resistor $R_g$ and capacitor $C_g$. The RC network may be configured to supply a voltage to Gm/Amp 200 based on the difference between the reference voltage and the output voltage. While simply feeding the output voltage back to GM/Amp 200 (e.g., as shown in FIG. 2) may be simpler, save space and improve load regulation, employing a configuration such as shown in reference comparison circuitry 120" may be advantageous in certain situations wherein the output voltage and the reference voltage are not necessarily close to each other because the output voltage is only AC coupled to the negative input of Gm/Amp 200. In addition, resistor $R_g$ and capacitor $C_g$ may offer more flexibility to change the feedback loop characteristics for desired performance.

Figure 4:
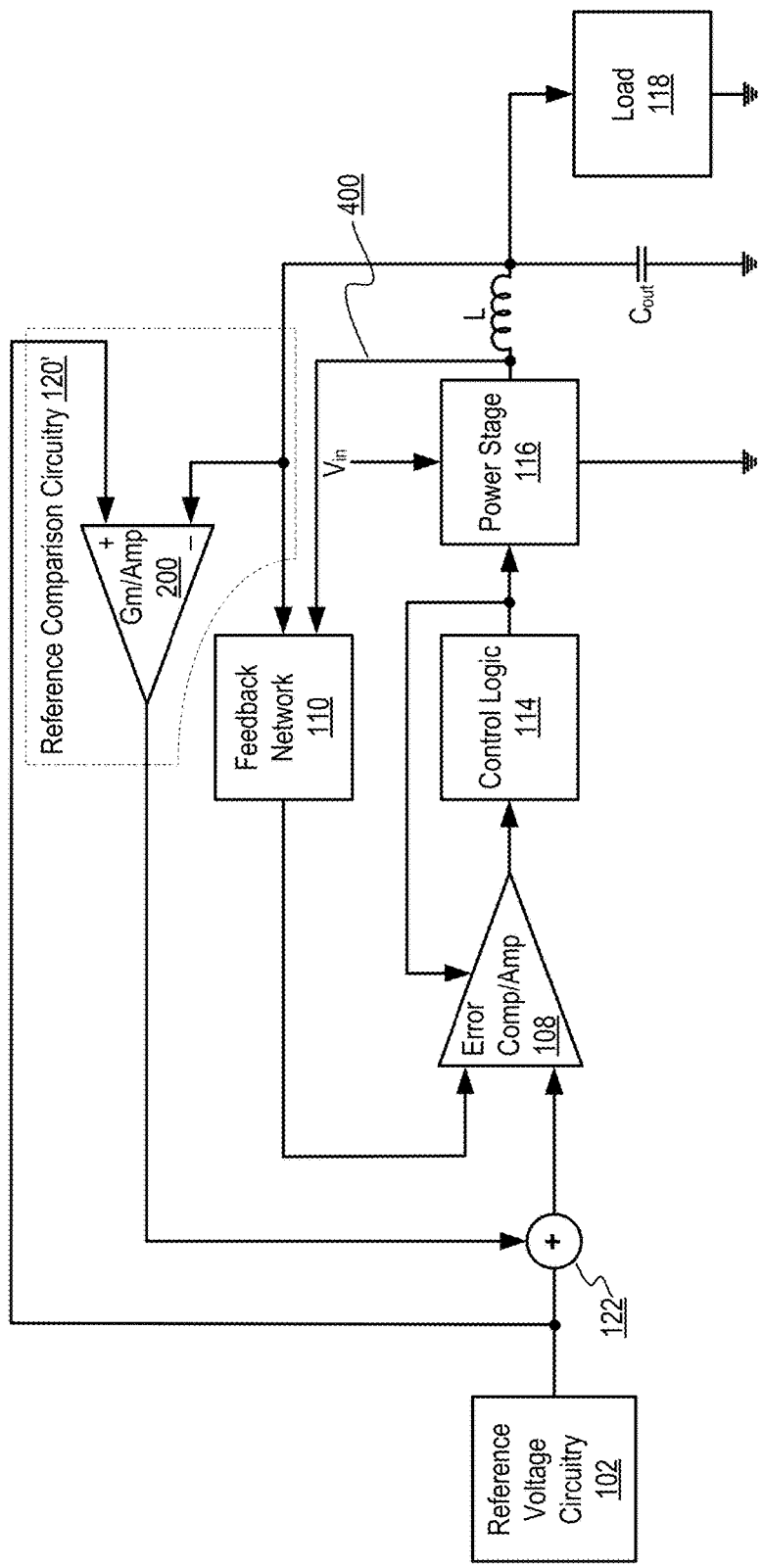
FIG. 4 illustrates an alternative configuration for an example fast load transient response power supply system using dynamic reference generation in accordance with at least one embodiment of the present disclosure.
Figure 5:
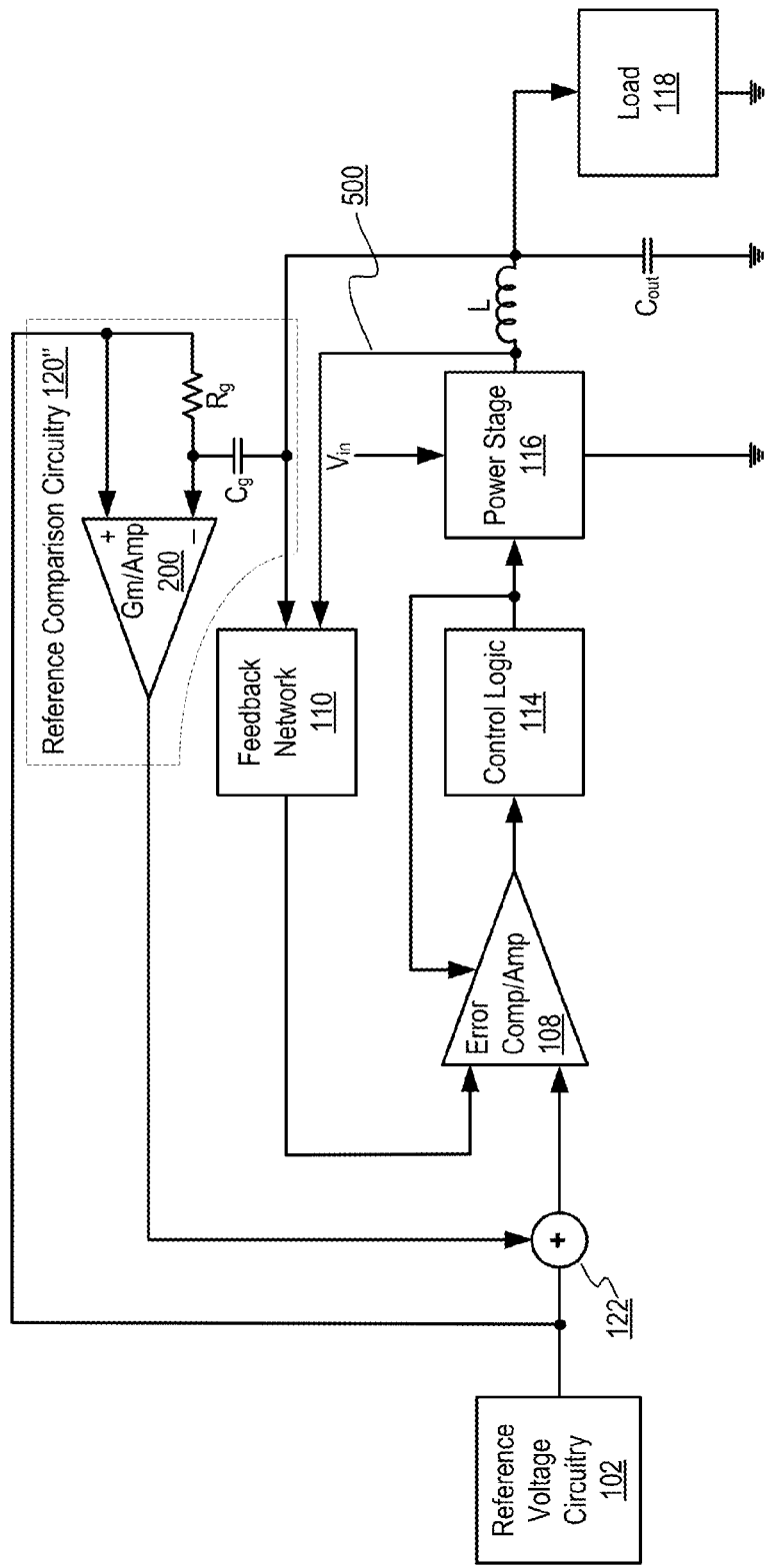
FIG. 5 illustrates a second alternative configuration for an example fast load transient response power supply system using dynamic reference generation in accordance with at least one embodiment of the present disclosure.

FIGS. 4 and 5 illustrate alternative configurations for an example fast load transient response power supply system using dynamic reference generation (e.g., systems 100''' and 100'''') consistent with the present disclosure. Systems 100''' and 100'''' each include an additional feedback 400 and 500, respectively, from the coupling between power stage circuitry 116 and inductor L to feedback network 110. Additional feedback 400 and 500 may be employed to, for example, sense the current through the inductor and use the sensed inductor current as part of the feedback loop to improve power conversion performance.

Figure 6:
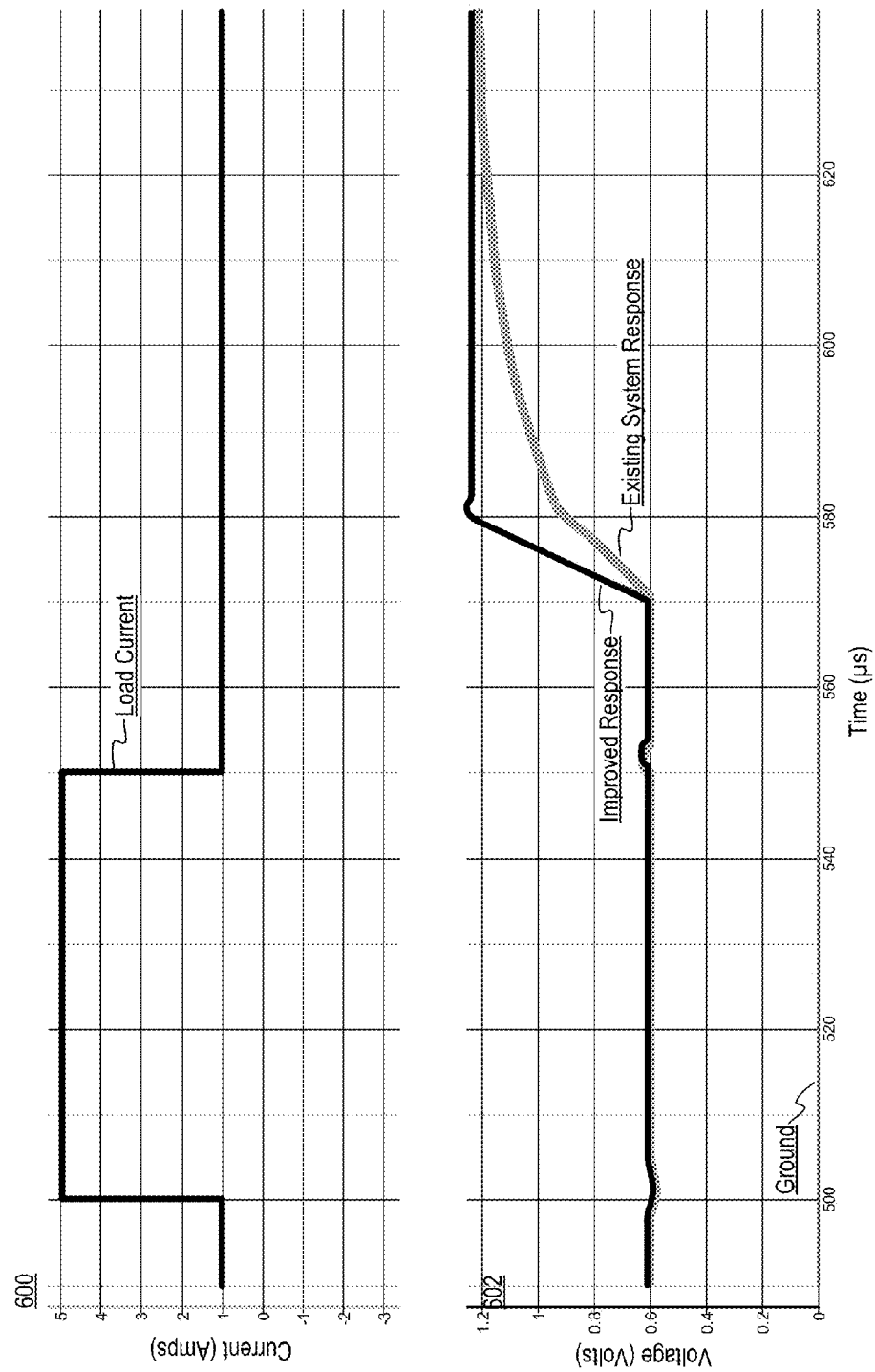
FIG. 6 illustrates a chart of example output voltage response in accordance with at least one embodiment of the present disclosure.

FIG. 6 illustrates a chart of example output voltage response in accordance with at least one embodiment. A first plot of load current (Amps) vs. time for a load changing its current between 1 Amps and 5 Amps is illustrated at 600. A corresponding plot of output voltage (volts) vs. time for a system using existing observer circuitry techniques (e.g., grey line) and an example output voltage using dynamic reference generation in accordance with at least one embodiment of the present disclosure (e.g., black line) is illustrated at 602. Initially, it is evident that a sharp rise in load current (e.g., occurring at time 500 μs) does not cause the output voltage at the corresponding time to droop substantially (e.g., the output voltage remains almost constant) in both the existing system and the system consistent with the present disclosure. Also, when a sharp decrease in load current (e.g., occurring at time 550 μs) does not cause the output voltage at the corresponding time to overshoot much (e.g., the output voltage remains almost constant) in both the existing system and the system consistent with the present disclosure. This behavior may be attributed to the fast load transient response provided by the secondary feedback loop circuitry in both systems.

However, a difference may be seen in a situation where the output voltage changes (e.g., occurring between 570 μs and 580 μs) due to, for example, the reference voltage being changed (e.g., in a DVS scheme). The system consistent with the present disclosure delivers faster response (e.g., indicated in FIG. 6 as "improved response") over the response of the existing system. Improved response may be realized because, in accordance with various embodiments, the use of the reference voltage as an input to the observer circuitry reference comparison circuitry and the dynamic reference generation circuitry to generate the dynamic reference voltage, which results in no or substantially less resistance to output voltage change when compared to existing observer circuitry techniques.

Figure 7:
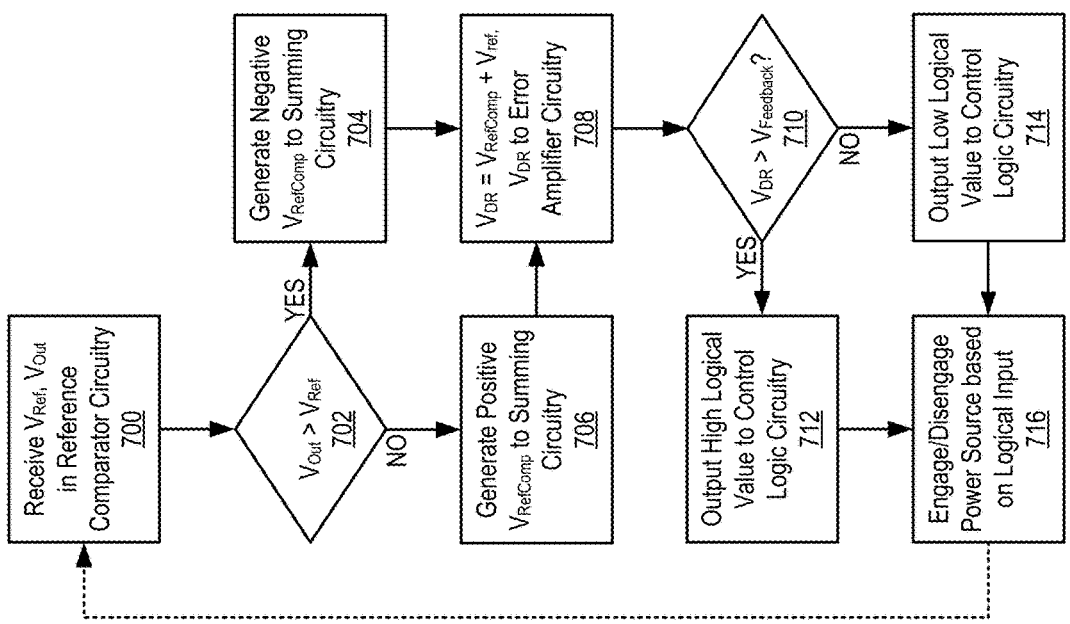
FIG. 7 illustrates a flowchart of example operations for a fast load transient response power supply system using dynamic reference generation in accordance with at least one embodiment of the present disclosure.

FIG. 7 illustrates a flowchart of example operations for a fast load transient response power supply system using dynamic reference generation in accordance with at least one embodiment of the present disclosure. In operation 700 a reference voltage ($V_{Ref}$) and an output voltage ($V_{Out}$) may be received (e.g., in dynamic reference generation circuitry). A determination may then be made in operation 702 as to whether $V_{Out}$ is greater than $V_{Ref}$. If it is determined in operation 702 that $V_{Out}$ is greater than $V_{Ref}$, then in operation 704 a negative reference comparison voltage ($V_{RefComp}$) based on $V_{Ref}$ and $V_{Out}$ (e.g., the difference between $V_{Ref}$ and $V_{Out}$) may be generated and provided to summing circuitry. Alternatively, if it is determined in operation 702 that that $V_{Ref}$ is greater than $V_{Out}$, then in operation 706 a positive $V_{RefComp}$ based on $V_{Ref}$ and $V_{Out}$ may be generated and provided to the summing circuitry.

Regardless of whether operation 704 or 706 is performed, operation 708 may then follow wherein a dynamic reference generation voltage ($V_{DR}$) is generated by adding $V_{Observer}$ to $V_{Ref}$. The $V_{DR}$ generated in operation 708 may then be supplied to error comparator or error amplifier circuitry. In operation 710 a determination may be made as to whether $V_{DR}$ is greater than a feedback voltage ($V_{Feedback}$) received from, for example, a feedback network. If it is determined in operation 710 that $V_{DR}$ is greater than $V_{Feedback}$, in operation 712 a high logical value may be provided to control logic circuitry. On the other hand, if it is determined in operation 710 that $V_{DR}$ is less than $V_{Feedback}$, then in operation 714 a low logical value may be provided to the control logic circuitry. In operation 716 a power source may be engaged or disengaged (e.g., by power stage circuitry) based on the logical input. For example, the power source may be engaged when a high logical value is received to supply a voltage to an inductor for charging a capacitor in power supply circuitry, or conversely, receiving a low logical value may cause the power source to be disengaged. In one embodiment, operation 716 may be followed by a return to operation 700 to reinitiate the flow.

While FIG. 7 illustrates various operations according to an embodiment, it is to be understood that not all of the operations depicted in FIG. 7 are necessary for other embodiments. Indeed, it is fully contemplated herein that in other embodiments of the present disclosure, the operations depicted in FIG. 7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

"Circuitry", as used in any embodiment herein, may comprise, for example, singly or in any combination, individual components, hardwired circuitry, programmable circuitry such as computer processors comprising one or more individual instruction processing cores, state machine circuitry, and/or firmware that stores instructions executed by programmable circuitry. The circuitry may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more machine-readable storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eM-MCs), secure digital input/output (SDIO) cards, magnetic or optical cards, or any type of media suitable for storing electronic instructions. Other embodiments may be implemented as software modules executed by a programmable control device.

Thus, the present disclosure is directed to a fast load transient response power supply system using dynamic reference voltage generation. A system may comprise, for example, at least power supply circuitry, voltage reference circuitry and dynamic reference generation circuitry. The power supply circuitry may be configured to generate an output voltage (e.g., for driving a load) based on a power supply input voltage. The voltage reference circuitry may be configured to generate a reference voltage for use in controlling the generation of the output voltage. The dynamic reference generation circuitry may be configured to generate a dynamic reference voltage as the input voltage for the power supply circuitry based on the reference voltage and the output voltage.

The following examples pertain to further embodiments. In one example embodiment there is provided a device. The device may include power supply circuitry configured to generate an output voltage for driving a load, the output voltage being generated based on an input voltage, voltage reference circuitry configured to provide a reference voltage; and dynamic reference generation circuitry configured to generate a dynamic reference voltage as the input voltage for the power supply circuitry based on the output voltage and the reference voltage.

In another example embodiment there is provided a method, the method may include receiving a reference voltage and an output voltage from power supply circuitry, generating a reference comparison voltage based on the reference voltage and the output voltage, generating a dynamic reference voltage based on the reference comparison voltage and the reference voltage, providing the dynamic reference voltage as input to the power supply circuitry, and generating the output voltage in the power supply circuitry based on the dynamic reference voltage.

In another example embodiment there is a provided a system comprising at least one machine-readable storage medium. The machine readable medium may have stored thereon, individually or in combination, instructions that when executed by one or more processors result in the following operations comprising receiving a reference voltage and an output voltage from power supply circuitry, generating a reference comparison voltage based on the reference voltage and the output voltage, generating a dynamic reference voltage based on the reference comparison voltage and the reference voltage, providing the dynamic reference voltage as input to the power supply circuitry, and generating the output voltage in the power supply circuitry based on the dynamic reference voltage.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
   power supply circuitry configured to generate an output voltage for driving a load, the output voltage being generated based on an input voltage;
   voltage reference circuitry configured to provide a reference voltage that is variable to control the output voltage of the power supply circuitry; and
   dynamic reference generation circuitry configured to generate a dynamic reference voltage as the input voltage for the power supply circuitry based on the output voltage and the reference voltage, wherein the dynamic reference generation circuitry comprises reference comparison circuitry including at least an amplifier configured to generate a reference comparison voltage based on the output voltage and the reference voltage.

2. The device of claim 1, wherein the reference comparison circuitry is configured to generate a positive reference comparison voltage based on the difference between the output voltage and the reference voltage when the output voltage is less than the reference voltage and to generate a negative reference comparison voltage based on the difference between the output voltage and the reference voltage when the output voltage is greater than the reference voltage.

3. The device of claim 1, wherein the dynamic reference generation circuitry further comprises a resister-capacitor network coupled to an input of the amplifier in the reference comparison circuitry, the resistor-capacitor network being configured to AC-couple the output voltage to the amplifier input and DC-couple the reference voltage to the amplifier input.

4. The device of claim 1, wherein the dynamic reference generation circuitry further comprises summing circuitry, the summing circuitry being configured to generate the dynamic reference voltage as input to the power supply circuitry based on adding the reference comparison voltage to the reference voltage.

5. The device of claim 4, wherein the power supply circuitry further comprises error comparator or error amplifier circuitry, control logic circuitry and feedback network circuitry, the error amplifier circuitry being configured to generate a logical input to the control logic circuitry based on the dynamic reference voltage and a feedback voltage provided by the feedback network circuitry.

6. The device of claim 5, wherein the error comparator or error amplifier circuitry is configured to generate a high logical input when the dynamic reference voltage is greater than the feedback voltage and to generate a low logical input when the dynamic reference voltage is less than the feedback voltage.

7. The device of claim 6, wherein the power supply circuitry further comprises power stage circuitry coupled to an inductor configured to generate the output voltage, the power stage circuitry being configured to engage a power source to supply a voltage to the inductor when the logical input is high and to disengage the power source from supplying the voltage to the inductor when the logical input is low.

8. The device of claim 7, wherein the feedback voltage circuitry is configured to generate the feedback voltage based on the voltage supplied to the inductor and the output voltage.

9. A method, comprising:
   receiving a reference voltage that is variable to control the output voltage of power supply circuitry and an output voltage from the power supply circuitry;
   generating a reference comparison voltage based on the reference voltage and the output voltage;
   generating a dynamic reference voltage based on the reference comparison voltage and the reference voltage;
   providing the dynamic reference voltage as input to the power supply circuitry; and
   generating the output voltage in the power supply circuitry based on the dynamic reference voltage.

10. The method of claim 9, wherein generating the reference comparison voltage comprises:
    generating a positive reference comparison voltage based on the difference between the output voltage and the reference voltage when the output voltage is less than the reference voltage; and
    generating a negative reference comparison voltage based on the difference between the output voltage and the reference voltage when the output voltage is greater than the reference voltage.

11. The method of claim 9, wherein generating the dynamic reference voltage comprises adding the reference comparison voltage to the reference voltage.

12. The method of claim 9, wherein generating the output voltage comprises generating a logical input based on the dynamic reference voltage and a feedback voltage.

13. The method of claim 12, wherein generating the logical input comprises:
    generating a high logical input when the dynamic reference voltage is greater than the feedback voltage; and
    generating a low logical input is generated when the dynamic reference voltage is less than the feedback voltage.

14. The method of claim 13, wherein generating the output voltage further comprises engaging a power source to charge an inductor in the power supply circuitry when the logical input is high and disengaging the power source from charging the inductor when the logical input is low.

15. At least one machine-readable storage medium having stored thereon, individually or in combination, instructions that when executed by one or more processors result in the following operations comprising:
    receiving a reference voltage that is variable to control the output voltage of power supply circuitry and an output voltage from the power supply circuitry;
    generating a reference comparison voltage based on the reference voltage and the output voltage;
    generating a dynamic reference voltage based on the reference comparison voltage and the reference voltage;
    providing the dynamic reference voltage as input to the power supply circuitry; and
    generating the output voltage in the power supply circuitry based on the dynamic reference voltage.

16. The medium of claim 15, wherein generating the reference comparison voltage comprises:
    generating a positive reference comparison voltage based on the difference between the output voltage and the reference voltage when the output voltage is less than the reference voltage; and
    generating a negative reference comparison voltage based on the difference between the output voltage and reference voltage when the output voltage is greater than the reference voltage.

17. The medium of claim 15, wherein generating the dynamic reference voltage comprises adding the reference comparison voltage to the reference voltage.

18. The medium of claim 15, wherein generating the output voltage comprises generating a logical input based on the dynamic reference voltage and a feedback voltage.

19. The medium of claim 18, wherein generating the logical input comprises:
    generating a high logical input when the dynamic reference voltage is greater than the feedback voltage; and
    generating a low logical input is generated when the dynamic reference voltage is less than the feedback voltage.

20. The medium of claim 19, wherein generating the output voltage further comprises engaging a power source to charge an inductor in the power supply circuitry when the logical input is high and disengaging the power source from charging the inductor when the logical input is low.

* * * * *